United States Patent
Atreya et al.

(10) Patent No.: US 9,606,781 B2
(45) Date of Patent: Mar. 28, 2017

(54) PARSER ENGINE PROGRAMMING TOOL FOR PROGRAMMABLE NETWORK DEVICES

(71) Applicant: CAVIUM, INC., San Jose, CA (US)

(72) Inventors: Kishore Badari Atreya, San Jose, CA (US); Ajeer Salil Pudiyapura, Sunnyvale, CA (US); Ravindran Suresh, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 14/675,667

(22) Filed: Mar. 31, 2015

(65) Prior Publication Data

US 2016/0139892 A1 May 19, 2016

Related U.S. Application Data

(60) Provisional application No. 62/080,119, filed on Nov. 14, 2014.

(51) Int. Cl.
*G06F 9/44* (2006.01)
*G06F 9/45* (2006.01)

(52) U.S. Cl.
CPC ............... *G06F 8/427* (2013.01); *G06F 8/71* (2013.01)

(58) Field of Classification Search
CPC .................................. G06F 8/71; G06F 8/427
USPC ......................................................... 717/143
See application file for complete search history.

(56) References Cited

U.S. PATENT DOCUMENTS

| | | |
|---|---|---|
| 5,781,729 A | 7/1998 | Baker et al. |
| 5,805,808 A | 9/1998 | Hasani et al. |
| 6,088,356 A | 7/2000 | Hendel et al. |
| 6,341,129 B1 | 1/2002 | Schroeder et al. |
| 6,606,301 B1 | 8/2003 | Muller et al. |
| 6,789,116 B1 | 9/2004 | Sarkissian et al. |
| 7,187,694 B1 | 3/2007 | Liao |
| 7,359,403 B1 | 4/2008 | Rinne |
| 7,367,052 B1 | 4/2008 | Desanti |
| 7,391,735 B2 | 6/2008 | Johnson |
| 7,568,047 B1 | 7/2009 | Aysan et al. |
| 7,606,263 B1 | 10/2009 | Parker |
| 7,710,959 B2 | 5/2010 | Ramasamy et al. |
| 7,715,611 B2 | 5/2010 | Eaton et al. |
| 7,822,032 B1 | 10/2010 | Parker et al. |
| 7,903,689 B2 | 3/2011 | Niinomi et al. |
| 8,031,640 B2 | 10/2011 | Mitsumori |
| 8,054,744 B1 | 11/2011 | Bishara |
| 8,112,800 B1 | 2/2012 | Yang et al. |
| 8,144,706 B1 | 3/2012 | Daniel et al. |
| 8,576,173 B2 | 11/2013 | Verhaegh |

(Continued)

OTHER PUBLICATIONS

Tran et al., "Achieving High-Performance On-Chip Networks With Shared-Buffer Routers", IEEE, 2013, 13pg.*

*Primary Examiner* — Ryan Coyer
(74) *Attorney, Agent, or Firm* — Haverstock & Owens LLP

(57) ABSTRACT

A parser engine programming tool configured to receive an input file representing a directly connected cyclical graph or tree of decision points for parsing a range of incoming packet headers, automatically generate all possible paths within the graph and thereby the associated possible headers, and convert the determined paths/headers into a proper format for programming memory of a parser engine to parse the determined headers (represented by the paths).

24 Claims, 2 Drawing Sheets

---

| Inputting the parser configuration file with a parser programming tool on a parser device. | 502 |

| Generating parser engine programming values with the parser programming tool based on the configuration file. | 504 |

(56) References Cited

U.S. PATENT DOCUMENTS

| | | |
|---|---|---|
| 8,705,533 B1 | 4/2014 | Venkatraman |
| 8,804,733 B1 | 8/2014 | Safrai |
| 9,313,115 B2 | 4/2016 | Kamerkar et al. |
| 2001/0050914 A1 | 12/2001 | Akahane et al. |
| 2002/0016852 A1 | 2/2002 | Nishihara |
| 2002/0062394 A1 | 5/2002 | Bunn et al. |
| 2002/0076142 A1 | 6/2002 | Song |
| 2002/0083210 A1 | 6/2002 | Harrison et al. |
| 2002/0163935 A1 | 11/2002 | Paatela et al. |
| 2002/0191521 A1 | 12/2002 | Minamino et al. |
| 2003/0037154 A1 | 2/2003 | Poggio et al. |
| 2003/0152078 A1 | 8/2003 | Henderson et al. |
| 2003/0193949 A1 | 10/2003 | Kojima et al. |
| 2003/0210702 A1 | 11/2003 | Kendall |
| 2003/0218978 A1 | 11/2003 | Brown |
| 2003/0231625 A1 | 12/2003 | Calvignac et al. |
| 2004/0064589 A1 | 4/2004 | Boucher et al. |
| 2005/0076228 A1 | 4/2005 | Davis |
| 2005/0213570 A1* | 9/2005 | Stacy ............... H04L 47/32 370/389 |
| 2005/0232303 A1 | 10/2005 | Deforche et al. |
| 2005/0276230 A1 | 12/2005 | Akahane et al. |
| 2005/0281281 A1 | 12/2005 | Nair et al. |
| 2006/0039372 A1 | 2/2006 | Sarkinen et al. |
| 2006/0168309 A1* | 7/2006 | Sikdar ............... G06F 8/427 709/232 |
| 2006/0215695 A1 | 9/2006 | Olderdissen |
| 2006/0280178 A1 | 12/2006 | Miller et al. |
| 2007/0078997 A1 | 4/2007 | Stern |
| 2008/0008159 A1 | 1/2008 | Bourlas et al. |
| 2009/0067325 A1 | 3/2009 | Baratakke et al. |
| 2009/0234818 A1 | 9/2009 | Lobo et al. |
| 2009/0238190 A1 | 9/2009 | Cadigan, Jr. et al. |
| 2010/0161787 A1 | 6/2010 | Jones |
| 2010/0272125 A1 | 10/2010 | Franke et al. |
| 2010/0329255 A1 | 12/2010 | Singhal |
| 2011/0022732 A1 | 1/2011 | Hutchison et al. |
| 2011/0058514 A1 | 3/2011 | Lee et al. |
| 2011/0134920 A1 | 6/2011 | Dyke |
| 2011/0142070 A1 | 6/2011 | Lim et al. |
| 2011/0261698 A1 | 10/2011 | Kamerkar et al. |
| 2011/0261812 A1 | 10/2011 | Kini et al. |
| 2011/0268123 A1* | 11/2011 | Kopelman ............ H04L 69/22 370/392 |
| 2011/0310892 A1 | 12/2011 | DiMambro |
| 2012/0281714 A1 | 11/2012 | Chang et al. |
| 2013/0039278 A1 | 2/2013 | Bouazizi et al. |
| 2013/0163427 A1 | 6/2013 | Beliveau et al. |
| 2013/0163475 A1* | 6/2013 | Beliveau ............ H04L 67/327 370/257 |
| 2013/0215906 A1* | 8/2013 | Hidai ............... H04L 69/22 370/474 |
| 2013/0238792 A1* | 9/2013 | Kind ............... H04L 43/026 709/224 |
| 2014/0119231 A1 | 5/2014 | Chan et al. |
| 2014/0153443 A1 | 6/2014 | Carter |
| 2014/0269307 A1* | 9/2014 | Banerjee ........... H04L 47/2441 370/235 |
| 2014/0328354 A1 | 11/2014 | Michael |
| 2014/0369365 A1 | 12/2014 | Denio et al. |
| 2015/0081726 A1 | 3/2015 | Izenberg |
| 2015/0189047 A1 | 7/2015 | Naaman et al. |
| 2015/0222533 A1 | 8/2015 | Birrittella et al. |
| 2015/0277911 A1 | 10/2015 | Khartikov et al. |

* cited by examiner

PARSER ENGINE PROGRAMMING TOOL FOR PROGRAMMABLE NETWORK DEVICES

RELATED APPLICATIONS

This application claims priority under 35 U.S.C. §119(e) of the U.S. provisional patent application Ser. No. 62/080,119, filed Nov. 14, 2014, and titled "A PARSER ENGINE PROGRAMMING TOOL," which is hereby incorporated by reference.

FIELD OF INVENTION

The present invention relates to network packets. More particularly, the present invention relates to programming a parser engine to flexibly parse a range of packets.

BACKGROUND OF THE INVENTION

A network packet includes multiple traffic or protocol layers, where each layer is independent of other layers. While traditional hardware implementations provide parsing abilities, the traditional hardware implementations are inflexible and resource inefficient.

BRIEF SUMMARY OF THE INVENTION

Embodiments are directed to a parser engine programming tool configured to receive an input file (e.g. extensible markup language (XML)) representing a directly connected cyclical graph or tree of decision points for parsing a range of incoming packet headers, automatically generate all possible paths within the graph and thereby the associated possible headers, and convert the determined paths/headers into a proper format for programming memory (e.g. TCAM and SRAM pairs of one or more kangaroo parsing units) of a parser engine to parse the determined headers (represented by the paths).

A first aspect is directed to a processing network comprising a processing circuit having a programmable parser including one or more parsing engines that parse data packets received by the processing circuit and a parser compiler stored on a non-transitory computer-readable memory and communicatively coupled with each of the parsing engines, wherein the parser compiler is configured to generate values based on a parser configuration file that when programmed into a memory associated with each of the parsing engines enables the parsing engines to identify each of a set of different combinations of packet headers represented by the parser configuration file. In some embodiments, the parser engines parse the data packets by identifying if the combination of headers of each of the data packets is one of the set of different combinations of packet headers. In some embodiments, the parser configuration file includes a directly connected cyclical graph having a plurality of paths, wherein a structure of the directly connected cyclical graph corresponds to the set of different combinations of packet headers. In some embodiments, the parser compiler generates the values based on the paths of the parser configuration file, and further wherein each of the paths corresponds to a separate combination of packet headers of the set of different combinations of packet headers. In some embodiments, the parser compiler determines all of the paths of the directly connected cyclical graph, wherein each of the paths either end and start at the same node within the graph or end at a terminating node within the graph that has no outgoing branches. In some embodiments, the memory associated with each of the parsing engines comprises ternary content-addressable memory paired with static random-access memory, and further wherein the parser engines identify the combination of packet headers of one of the data packets based on a first portion of the values stored in the ternary content-addressable memory and determine what actions to perform with the one of the data packets based on a second portion of the values stored in the static random-access memory paired with the ternary content-addressable memory. In some embodiments, each type of header of the combinations of packet headers has a layer type and the ternary content-addressable memory comprises a plurality of entries, and further wherein the parser compiler stores the first portion of the values within the ternary content-addressable memory such that headers having different layer types do not occupy the same entry. In some embodiments, the parser compiler automatically remove duplicate entries of the entries of the ternary content-addressable memory. In some embodiments, different types of the headers of the combinations are able to have the same layer type.

A second aspect is directed to a parser compiler stored on a non-transitory computer-readable memory and configured to input a parser configuration file and generate values based on the parser configuration file that when programmed into a memory associated with each of a plurality of parsing engines enables the parsing engines to identify each of a set of different combinations of packet headers represented by the parser configuration file, wherein the parsing engines are a part of a programmable parser of a processing circuit that parses data packets received by the processing circuit. In some embodiments, the parser engines parse the data packets by identifying if the combination of headers of each of the data packets is one of the set of different combinations of packet headers. In some embodiments, the parser configuration file includes a directly connected cyclical graph having a plurality of paths, wherein a structure of the directly connected cyclical graph corresponds to the set of different combinations of packet headers. In some embodiments, the parser compiler generates the values based on the paths of the parser configuration file, and further wherein each of the paths corresponds to a separate combination of packet headers of the set of different combinations of packet headers. In some embodiments, the parser compiler determines all of the paths of the directly connected cyclical graph, wherein each of the paths either end and start at the same node within the graph or end at a terminating node within the graph that has no outgoing branches. In some embodiments, the memory associated with each of the parsing engines comprises ternary content-addressable memory paired with static random-access memory, and further wherein the parser engines identify the combination of packet headers of one of the data packets based on a first portion of the values stored in the ternary content-addressable memory and determine what actions to perform with the one of the data packets based on a second portion of the values stored in the static random-access memory paired with the ternary content-addressable memory. In some embodiments, each type of header of the combinations of packet headers has a layer type and the ternary content-addressable memory comprises a plurality of entries, and further wherein the parser compiler stores the first portion of the values within the ternary content-addressable memory such that headers having different layer types do not occupy the same entry. In some embodiments, the parser compiler automatically remove duplicate entries of the entries of the ternary content-addressable memory. In some embodiments, different types of the headers of the combinations are able to have the same layer type.

A third aspect is directed to a method of operating a parser compiler. The method comprises inputting a parser configuration file with a parsing device storing the parser compiler and generating values with the parser compiler based on the parser configuration file, wherein the values, when programmed into a memory associated with each of a plurality of parsing engines, enable the parsing engines to identify each of a set of different combinations of packet headers represented by the parser configuration file, wherein the parsing engines are a part of a programmable parser of a processing circuit that parses data packets received by the processing circuit. In some embodiments, the parser engines parse the data packets by identifying if the combination of headers of each of the data packets is one of the set of different combinations of packet headers. In some embodiments, the parser configuration file includes a directly connected cyclical graph having a plurality of paths, wherein a structure of the directly connected cyclical graph corresponds to the set of different combinations of packet headers. In some embodiments, the generating of the values is based on the paths of the parser configuration file, and further wherein each of the paths corresponds to a separate combination of packet headers of the set of different combinations of packet headers. In some embodiments, the method further comprises determining all of the paths of the directly connected cyclical graph with the parser compiler, wherein each of the paths either end and start at the same node within the graph or end at a terminating node within the graph that has no outgoing branches. In some embodiments, the memory associated with each of the parsing engines comprises ternary content-addressable memory paired with static random-access memory, and further wherein the parser engines identify the combination of packet headers of one of the data packets based on a first portion of the values stored in the ternary content-addressable memory and determine what actions to perform with the one of the data packets based on a second portion of the values stored in the static random-access memory paired with the ternary content-addressable memory. In some embodiments, each type of header of the combinations of packet headers has a layer type and the ternary content-addressable memory comprises a plurality of entries, further comprising storing the first portion of the values within the ternary content-addressable memory with the parser compiler such that headers having different layer types do not occupy the same entry. In some embodiments, the method further comprises automatically removing duplicate entries of the entries of the ternary content-addressable memory with the parser compiler. In some embodiments, different types of the headers of the combinations are able to have the same layer type.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a parser engine programming tool configured to receive a configuration input file (e.g. extensible markup language (XML)) representing a directly connected cyclical graph or tree of decision points for parsing a range of incoming packet headers, automatically generate all possible paths within the graph and thereby the associated possible headers, and convert the determined paths/headers into a proper format for programming memory (e.g. TCAM and SRAM pairs of one or more kangaroo parsing units) of a parser engine to parse the determined headers (represented by the paths). As a result, the parser engine programming tool provides the advantage of enabling different combinations of header types (e.g. Ethernet, IPv4, IPv6) forming the header of a data packet to be parsed by a programmable parsing engine wherein all of the combinations are automatically determined by the programming tool.

Figure 1:
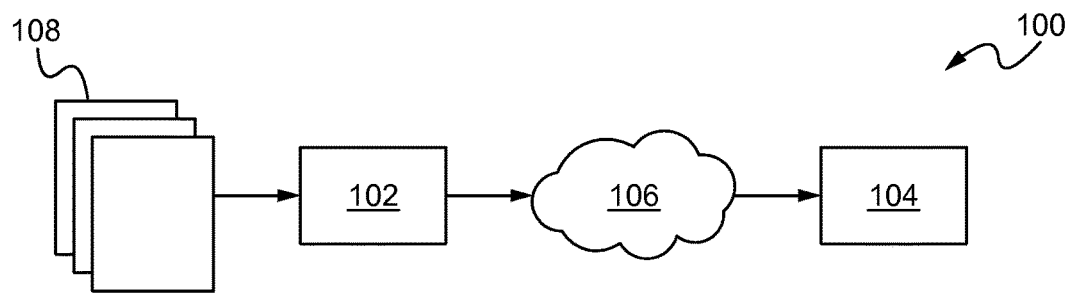
FIG. 1 illustrates a parsing network according to some embodiments.

FIG. 1 illustrates a parsing network 100 according to some embodiments. As shown in FIG. 1, the parsing network 100 comprises a parser engine programming tool 102 configured to receive a configuration input file 108 and coupled with a parser engine 104 over a network 106. Although in FIG. 1, the programming tool 102 is only coupled with a single parser engine 104, two or more parser engines 104 are contemplated. In some embodiments, the network 106 is a wired network. Alternatively, the network 106 is able to be wireless or a combination of wired and wireless networks. The parser engine 104 is able to be stored on a processing circuit or microchip. For example, the parser engine 104 is able to be a part of a software defined network (SDN) chip such as a switch microchip for a data center top of rack switch. Alternatively, the parser engine 104 is able to be a part of any application specific integrated circuit (ASIC) chip, general purpose microchip or other types of processing microchip known in the art.

In some embodiments, the configuration input file 108 is a single extensible markup language (XML) file. Alternatively, the input file 108 is able to be one or a plurality of files that are XML or a different type of file format. In some embodiments, the parser engine programming tool 102 is stored on the same processing circuit or microchip as the parser engine 104 such that the network 106 is an internal network of the circuit/microchip. Alternatively, the parser engine programming tool 102 is able to be stored on a memory of a server or other type of computing device remote from the parser engine 104, wherein the parser engine programming tool 102 is a downloadable and/or remotely executable application or website on the server and/or a downloadable application on a computer that is able to be locally executed and the output downloaded onto the parser engine 104. As a result, the parser engine programming tool 102 is able to be a standalone programming application or a built-in feature of a circuit/microchip storing the parser engine 104.

Figure 2:
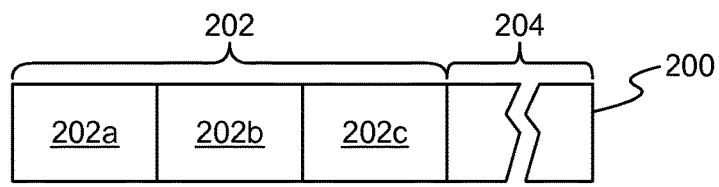
FIG. 2 illustrates an exemplary data packet according to some embodiments.

FIG. 2 illustrates an exemplary data packet 200 according to some embodiments. As shown in FIG. 2, the data packet 200 comprises header data 202 and payload data 204 wherein the header data 202 includes one or more types of headers 202a, 202b, 202c. The headers which combined form the header data 202 of the packet 200 are able to be from different or the same protocol. For example, the headers 202a, 202b, 202c are each able to be from a different protocol. Alternatively, one or more of the headers are able to be from the same protocol. The protocols to which the types of headers conform includes, but is not limited to, Ethernet (eth), internet protocol version 4 (IPv4), internet protocol version 6 (IPv6), transmission control protocol (tcp), multiprotocol label switching (mpls), virtual lan tag (vntag), transparent interconnection of lots of links (trill), bridge protocol data unit (bpdu), subnetwork access protocol (snap), IEEE 802.1 Q (dot1q), reverse address resolution protocol (rarp), address resolution protocol (arp), backbone service instance tag (I-tag), link layer discover protocol (lldp), media access control security (macsec), stateless transport tunnelling (stt), IPv6 hop-by-hop option (hopopt), locator/identifier separation protocol (lisp), user datagram protocol (udp), overlay transport virtualization (otv), network time protocol (ntp), precision time protocol (ptp), generic routing encapsulation (gre) and fiber channel over Ethernet (fcoe). Additionally, although FIG. 2 illustrates the header data 202 having three types of headers 202a, 202b, 202c, the header data 202 of each data packet 200 is able to have more or less headers.

Figure 3:
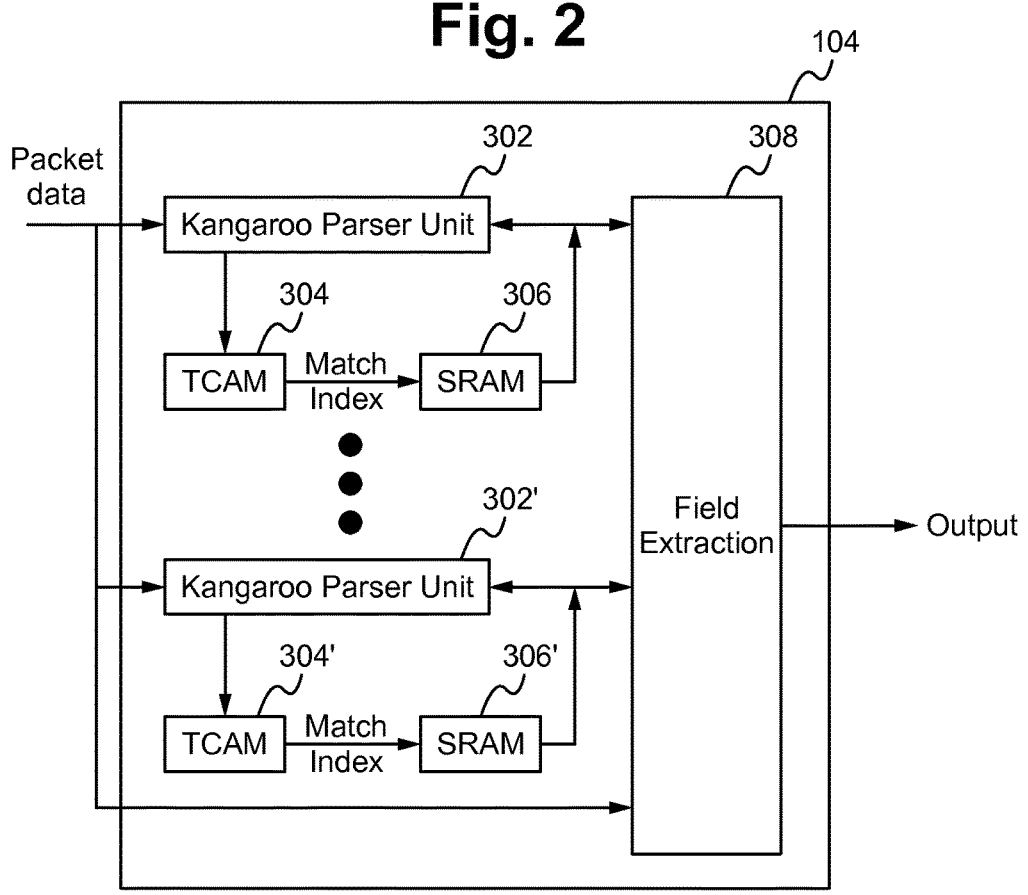
FIG. 3 illustrates a parser engine according to some embodiments.

FIG. 3 illustrates a parser engine 104 according to some embodiments. As shown in FIG. 3, the parser engine 104 comprises one or more kangaroo parser units (KPUs) 302 coupled with a field extraction unit 308 and ternary content-addressable memory (TCAM) 304 paired with static random-access memory (SRAM) 306. Alternatively, the TCAM 304 and/or SRAM 306 is able to be other types of memory as are known in the art. Additionally, although the TCAM 304, 304' and SRAM 306, 306' memory pairs are shown separate for each of the KPUs 302, 302', they are able to comprise a single TCAM memory and/or SRAM memory wherein each KPU 302, 302' is associated with a portion of the memory. In operation, the KPUs 302, 302' receive incoming packets 200 and parse the header data 202 of the packet 200 based on the parsing data stored in the TCAM 304 and SRAM 306. In particular, the header data 202 is able to be identified by the TCAM 304 and an index or other identifier of the TCAM 304 is able to be used to find the correct data within the SRAM 306 indicating what actions need to take place for the packet 200. Based on the parsing of the header data 202, the field extraction unit 308 is able to extract the needed data from the packet 200 (e.g. data from one or more of the headers 202a, 202b, 202c) for output from the parser engine 104 such that the packet 200 is able to be properly processed.

In order for the parser engine 104 to be able to perform the above parsing functions, it must first be properly be programmed by the parse programming tool 102. In particular, the parse programming tool 102 must program the parser engine 104 such that any type of header data 200 within the range of possible header data 200 specified is able to be properly parsed by the parser engine 104. As a result, the programming tool 102 is configured to read the input configuration file 108 and automatically (based on the data within the file 108) generate a set of values necessary to program the parser engine 104 to handle all of the possible header data 200 represented by the configuration file 108.

Figure 4:
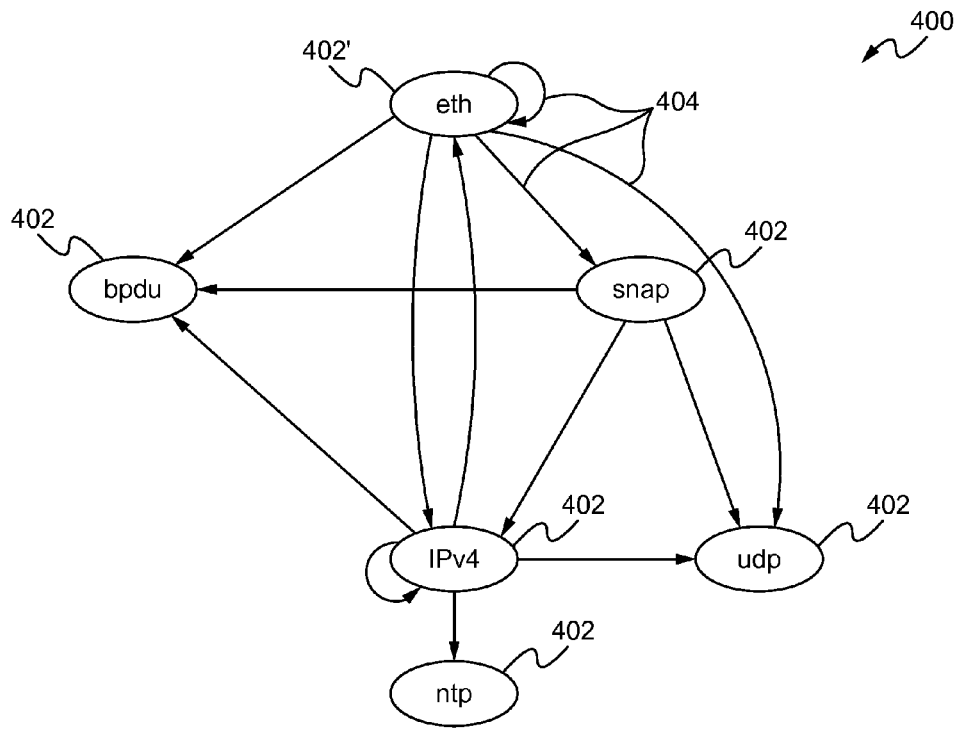
FIG. 4 illustrates an exemplary directly connected cyclical graph or parse tree according to some embodiments.

The configuration file 108 indicates the range of possible header data 200 that the parse engine 104 needs to be able to parse by describing a directly connected cyclical graph or parse tree of the possible header data. FIG. 4 illustrates an exemplary directly connected cyclical graph or parse tree 400 according to some embodiments. As shown in FIG. 4, the cyclical graph 400 comprises one or more nodes or leaves 402 that are each coupled together by unidirectional branches or edges 404. In particular, the cyclical graph or tree 400 is able to comprise a root node 402' as a starting point, a plurality of leaf nodes 402 and a plurality of transitions/branches 404 between the nodes 402. The nodes 402, 402' are able to each include a header type or layer name (e.g. eth, ipv4, arp, ptp), an advance or packet pointer offset value for the indicated header layer (not shown), a layer type identifier (not shown) and a state value within the layer (not shown). In some embodiments, the layer type corresponds to the seven layers of the open system interconnection (OSI) model. Alternatively, one or more of the layer types are able to deviate from the OSI model such that headers 202a, 202b, 202c that would be in different layers according to OSI are given the same layer type value, or vice versa. Additionally, the nodes 402, 402' are able to comprise the header layer names of any connected nodes 402. The transitions/branches 404 are able to each include a match value (e.g. 8100) and a mask (e.g. ffff) associated with the transition between the two associated nodes 402. In that way, the match and mask values are able to represent that transition between the two nodes 402. As a result, the permutations of paths (between the nodes 402 via the branches 404) through the graph or tree 400 are each able to represent a set of header data 202 having the combination of packet headers 202a, 202b, 202c represented by the nodes 402 within the path. These paths represent the range that need to be parsed by the KPUs 302 of the programmable parser engine 104.

In order to determine all the possible paths through the cyclical graph 400, the tool 102 is able to walk the graph or tree 400 using a modified depth first search. In particular, starting from one of the nodes 402, the programming tool 102 walks down one of the possible paths through the graph or tree 400 (as permitted by the directional connections) until the tool 102 reaches a terminating node (e.g. a node with no outgoing branches 404) or the starting node (e.g. when a loop has been completed). Alternatively, in some embodiments even if the starting node is reached, the programming tool 102 is able to continue until a terminating node is reached or the starting node is reached a second or more times. In any case, during the "walk," the tool 102 is able to sequentially add the data associated with each node 402 and branch 404 traversed to a stack such that the stack includes a journal or list of the path taken. When the terminating node or starting node 402 is reached, the current stack is determined and saved as a complete path and the process is repeated to find a new complete path until all of the possible paths and their associated stacks have been determined. In this way, each of the combinations of headers 202a, 202b, 202c that are able to form the header data 202 of a packet 200 are represented by one of the paths such that the programming tool 102 provided the advantage of automatically identifying all of the possible header data 202 based on the input configuration file 108. In some embodiments, one or more of the header combinations or paths determined by the tool 102 are able to be omitted. Alternatively, all of the headers possible within the graph or tree 400 are able to be included.

Once all of the stacks have been determined, the parser programming tool 102 is able to perform a "flattening" process to convert the stacks to a proper format for programming entries for TCAM 304 and SRAM 306 pairs of the KPUs 302 of the parser 104. Specifically, the stacks, each including a list of visited nodes 402 (and the associated values described above) and their accompanying branches 404 (and the associated values described above) to the next node visited, are "flattened" into a flattened stack that includes header type, match, mask and layer type values for each visited node within a layer boundary as a single entry in the flattened stack. In other words, for each stack (i.e. path), the values associated with the nodes 402 of the path are able to be re-organized by layer type (and thus the header types associated with the nodes 402 of the path are organized by layer type). As a result, each entry in this flattened stack of layers will effectively represent the layer format for that layer for a packet 200 having packet data 202 matching the path associated with the flattened stack.

The programming tool 102 is then able to, for each layer of each flattened stack, generate TCAM entries to be programmed into the TCAM 304 of the parser 302. Specifically, the flattened layers of the flattened stack are segmented into groups corresponding to the number of decision points each KPU 302 supports (e.g. a KPU 302 supports three decision points, each entry within the TCAM 304 is able to correspond to three decision points or header types within the flattened stack). In some embodiments, each KPU 302 supports the same number of decision points. Alternatively, on or more of the KPUs 302 are able to support different numbers of decision points. Additionally, in generating the TCAM entries, the programming tool 102 is able to follow one or more of the following rules: 1) a layer or flattened stack entry is able to span more than one TCAM entry, 2) a plurality of layers or flattened stack entries are not able to share a single TCAM entry, and 3) meta data values of a node 402 are included in the TCAM entry for that node 402. In some embodiments, while generating and assigning the TCAM entries, the programming tool 102 automatically deletes duplicate TCAM entries such that only unique TCAM entries are stored. In some embodiments, the tool 102 sorts the TCAM entries according to longest prefix matching order. In particular, in some embodiments the tool 102 is configured to convert all of the prefixes of each path into strings, to order the strings according to longest prefix matching order, and then to convert the strings back to their original format for storing as TCAM entries. Alternatively, other methods of ordering the entries according to longest prefix matching order are able to be used.

The programming tool 102 is also able to generate SRAM entries based on the entries of the flattened stacks and/or the TCAM entries. Specifically, the programming tool 102 uses the advance value of the initial node of the associated TCAM entries to calculate and program a packet advance value in the corresponding SRAM entries. Further, this advance value in the initial node is able to be used to determine the decision point (e.g. node/header type) offsets within the header data 202. In other words, the previous advance values are able to be used in order to determine the offsets of the current decision point (e.g. node/header type). Additionally, if the corresponding TCAM entry completes a layer, the tool 102 is able to set a first push to stack bit in the corresponding SRAM entry. Also, if at the last layer of the header data 202 of a packet 200 (e.g. the last layer/entry of the flattened stack for the header data 202), the tool sets a second push to stack bit to push the last part of the header 202 to the stack. Finally, the parser programming tool 102 is able to use the transition or branch identifier (e.g. assigned by the traversal in the layer) and program the ID to the SRAM entry. As described above with reference to FIG. 3, these generated SRAM entries are able to have the same index as the corresponding TCAM entry such that the two entries are able to be associated as a pair. In particular, this enables the TCAM entries to be used by the parser 104 to perform the matches for the packet headers 202 to identify the headers 202 and then utilize the same index value within the SRAM 306 (e.g. direct access table) to reference what operations/actions need to be performed for the packet/header 200, 202 stored in the associated or paired SRAM entry. These operations/actions are able to comprise indications of when parsing is complete, when one or more layers have been terminated, what is the next node/decision point (e.g. node/header type) and/or how far does the packet/header pointer need to be advanced.

Finally, the parser programming tool is able to store the TCAM and SRAM values in the assigned TCAM 304 and SRAM 306 pairs of each of the KPUs 302 of the parser 104 such that the parser 104 is able to parse all of the possible headers 202 indicated within the graph or tree 400 of the input configuration file 108.

Figure 5:
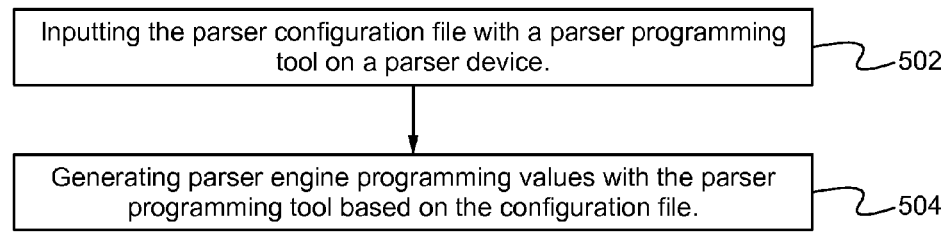
FIG. 5 illustrates a method of operating the parser programming tool according to some embodiments.

FIG. 5 illustrates a method of operating the parser programming tool 102 according to some embodiments. As shown in FIG. 5, a parsing device storing the parser programming tool 102 inputs the parser configuration file 108 with the tool 102 at the step 502. In some embodiments, the programming tool 102 comprises a graphical user interface with an input features that enables the inputting of the parser configuration file. Alternatively, the programming tool 102 is able to automatically search the parsing device for the configuration file 108. The parsing programming tool 102 generates parser engine programming values based on the configuration file 108 at the step 504. The values, when programmed into a memory (e.g. TCAM 304, SRAM 306) associated with each of a plurality of parsing engines (e.g. KPUs 302), are able to enable the parsing engines to identify each of a set of different combinations of packet headers (e.g. header data 202) represented by the configuration file 108. In some embodiments, the generating of the values is based on one or more of the possible paths with a graph 400 of the parser configuration file 108, wherein each of the paths corresponds to a separate combination of packet headers 202 (e.g. stack or flattened stack). In some embodiments, generating the values includes the parser programming tool 102 automatically calculating all of the paths of the directly connected cyclical graph 400. For example, the tool 102 is able to determine each of the paths either end and start at the same node 402 within the graph or end at a terminating node 402 within the graph 400 that has no outgoing branches 404. In some embodiments, the method further comprises the tool 102 storing a first portion of the values within entries of the TCAM 304 such that the data associated with header types 202a, 202b, 202c having different layer types do not occupy the TCAM entry. In some embodiments, the method further comprises the tool 102 automatically removing duplicate entries of the entries of the TCAM 304. As a result, the method provides the advantage of automatically programming one or more parsing engines such that they are able to parse any combination of header types 202a, 202b, 202c forming the header data 202 of a packet 200 as represented by a configuration file 108.

The parser system, method and device described herein provides numerous advantages. In particular, the parser programming tool provides the advantage of automatically enabling different combinations of header types (e.g. Ethernet, IPv4, IPv6) forming the header of a data packet to be parsed by a programmable parsing engine wherein all of the combinations are automatically determined by the programming tool. Further, it provides the advantage of creating flattened stacks of values that are separated by layer such that they are able to easily be programmed into one or more parser engines such that they correctly parse the incoming packets. Thus, the parser system, method and device has many advantages.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A processing network comprising:
a processing circuit having a programmable parser including one or more parsing engines that parse data packets received by the processing circuit; and
a parser compiler stored on a non-transitory computer-readable memory and communicatively coupled with each of the parsing engines, wherein the parser compiler is configured to generate values based on a parser configuration file that when programmed into a memory associated with each of the parsing engines enables the parsing engines to identify each of a set of different combinations of packet headers represented by the parser configuration file, wherein the memory associated with each of the parsing engines comprises ternary content-addressable memory paired with static random-access memory, and further wherein the parsing engines identify the combination of packet headers of one of the data packets based on a first portion of the values stored in the ternary content-addressable memory that indicate the combination of packet header of the one of the data packets and determine what actions to perform with the one of the data packets based on a second portion of the values stored in the static random-access memory paired with the ternary content-addressable memory that indicate the actions to perform with the one of the data packets.

2. The network of claim 1, wherein the parsing engines parse the data packets by identifying if the combination of headers of each of the data packets is one of the set of different combinations of packet headers.

3. The network of claim 2, wherein the parser configuration file includes a directly connected cyclical graph having a plurality of paths, wherein a structure of the directly connected cyclical graph corresponds to the set of different combinations of packet headers.

4. The network of claim 3, wherein the parser compiler generates the values based on the paths of the parser configuration file, and further wherein each of the paths corresponds to a separate combination of packet headers of the set of different combinations of packet headers.

5. The network of claim 4, wherein the parser compiler determines all of the paths of the directly connected cyclical graph, wherein each of the paths either end and start at the same node within the graph or end at a terminating node within the graph that has no outgoing branches.

6. The network of claim 5, wherein each type of header of the combinations of packet headers has a layer type and the ternary content-addressable memory comprises a plurality of entries, and further wherein the parser compiler stores the first portion of the values within the ternary content-addressable memory such that headers having different layer types do not occupy the same entry.

7. The network of claim 6, wherein the parser compiler automatically remove duplicate entries of the entries of the ternary content-addressable memory.

8. The network of claim 7, wherein different types of the headers of the combinations are able to have the same layer type.

9. A parser compiler stored on a non-transitory computer-readable memory and configured to:
input a parser configuration file; and
generate values based on the parser configuration file that when programmed into a memory associated with each of a plurality of parsing engines enables the parsing engines to identify each of a set of different combinations of packet headers represented by the parser configuration file, wherein the parsing engines are a part of a programmable parser of a processing circuit that parses data packets received by the processing circuit, wherein the memory associated with each of the parsing engines comprises ternary content-addressable memory paired with static random-access memory, and further wherein the parsing engines identify the combination of packet headers of one of the data packets based on a first portion of the values stored in the ternary content-addressable memory that indicate the combination of packet header of the one of the data packets and determine what actions to perform with the one of the data packets based on a second portion of the values stored in the static random-access memory paired with the ternary content-addressable memory that indicate the actions to perform with the one of the data packets.

10. The parser compiler of claim 9, wherein the parsing engines parse the data packets by identifying if the combination of headers of each of the data packets is one of the set of different combinations of packet headers.

11. The parser compiler of claim 10, wherein the parser configuration file includes a directly connected cyclical graph having a plurality of paths, wherein a structure of the directly connected cyclical graph corresponds to the set of different combinations of packet headers.

12. The parser compiler of claim 11, wherein the parser compiler generates the values based on the paths of the parser configuration file, and further wherein each of the paths corresponds to a separate combination of packet headers of the set of different combinations of packet headers.

13. The parser compiler of claim 12, wherein the parser compiler determines all of the paths of the directly connected cyclical graph, wherein each of the paths either end and start at the same node within the graph or end at a terminating node within the graph that has no outgoing branches.

14. The parser compiler of claim 13, wherein each type of header of the combinations of packet headers has a layer type and the ternary content-addressable memory comprises a plurality of entries, and further wherein the parser compiler stores the first portion of the values within the ternary content-addressable memory such that headers having different layer types do not occupy the same entry.

15. The parser compiler of claim 14, wherein the parser compiler automatically remove duplicate entries of the entries of the ternary content-addressable memory.

16. The parser compiler of claim 15, wherein different types of the headers of the combinations are able to have the same layer type.

17. A method of operating a parser compiler, the method comprising:
inputting a parser configuration file with a parsing device storing the parser compiler; and
generating values with the parser compiler based on the parser configuration file, wherein the values, when programmed into a memory associated with each of a plurality of parsing engines, enable the parsing engines to identify each of a set of different combinations of packet headers represented by the parser configuration file, wherein the parsing engines are a part of a programmable parser of a processing circuit that parses data packets received by the processing circuit, wherein the memory associated with each of the parsing engines comprises ternary content-addressable memory paired with static random-access memory, and further wherein the parsing engines identify the combination of packet headers of one of the data packets based on a first portion of the values stored in the ternary content-addressable memory that indicate the combination of packet header of the one of the data packets and determine what actions to perform with the one of the data packets based on a second portion of the values stored in the static random-access memory paired with the ternary content-addressable memory that indicate the actions to perform with the one of the data packets.

18. The method of claim 17, wherein the parsing engines parse the data packets by identifying if the combination of headers of each of the data packets is one of the set of different combinations of packet headers.

19. The method of claim 18, wherein the parser configuration file includes a directly connected cyclical graph having a plurality of paths, wherein a structure of the directly connected cyclical graph corresponds to the set of different combinations of packet headers.

20. The method of claim 19, wherein the generating of the values is based on the paths of the parser configuration file, and further wherein each of the paths corresponds to a separate combination of packet headers of the set of different combinations of packet headers.

21. The method of claim 20, further comprising determining all of the paths of the directly connected cyclical graph with the parser compiler, wherein each of the paths either end and start at the same node within the graph or end at a terminating node within the graph that has no outgoing branches.

22. The method of claim 21, wherein each type of header of the combinations of packet headers has a layer type and the ternary content-addressable memory comprises a plurality of entries, further comprising storing the first portion of the values within the ternary content-addressable memory with the parser compiler such that headers having different layer types do not occupy the same entry.

23. The method of claim 22, further comprising automatically removing duplicate entries of the entries of the ternary content-addressable memory with the parser compiler.

24. The method of claim 23, wherein different types of the headers of the combinations are able to have the same layer type.

* * * * *